Dec. 29, 1936.　　J. FAURE ET AL　　2,065,999
UNIVERSAL JOINT
Filed May 9, 1935　　4 Sheets-Sheet 1

INVENTORS
JOANNY FAURE
ANTOINE PIERRE CHAVRIER
BY Haseltine Lake & Co.
ATTORNEYS Dec. 29, 1936.  J. FAURE ET AL  2,065,999
UNIVERSAL JOINT
Filed May 9, 1935  4 Sheets-Sheet 2
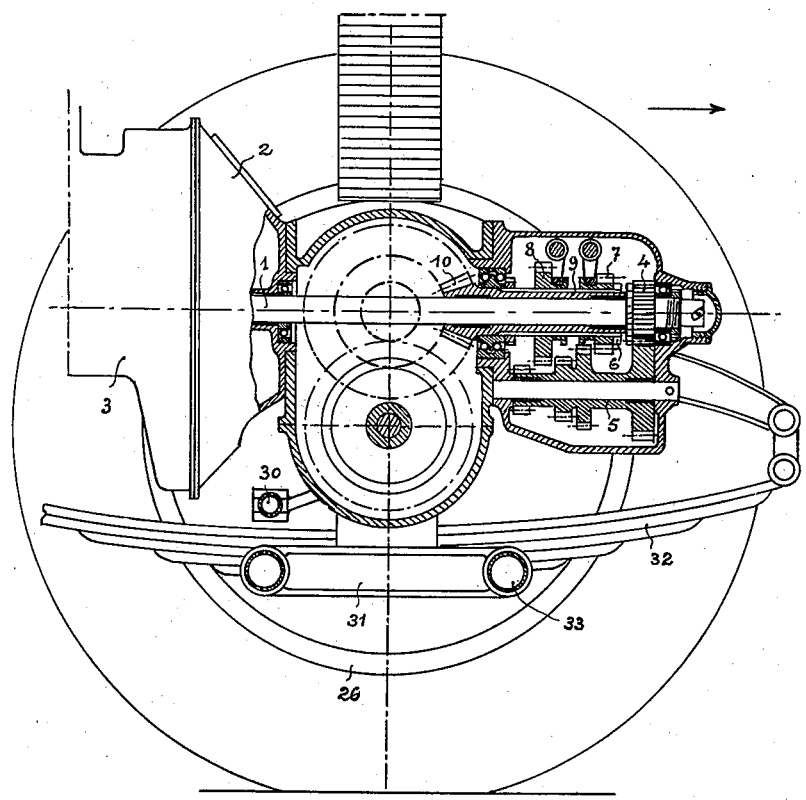
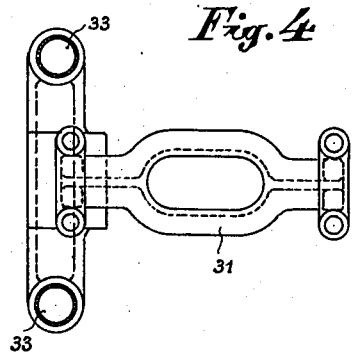
INVENTORS
JOANNY FAURE
ANTOINE PIERRE CHAVRIER
BY Haseltine, Lake & Co.
ATTORNEYS Dec. 29, 1936.  J. FAURE ET AL  2,065,999
UNIVERSAL JOINT
Filed May 9, 1935   4 Sheets-Sheet 3
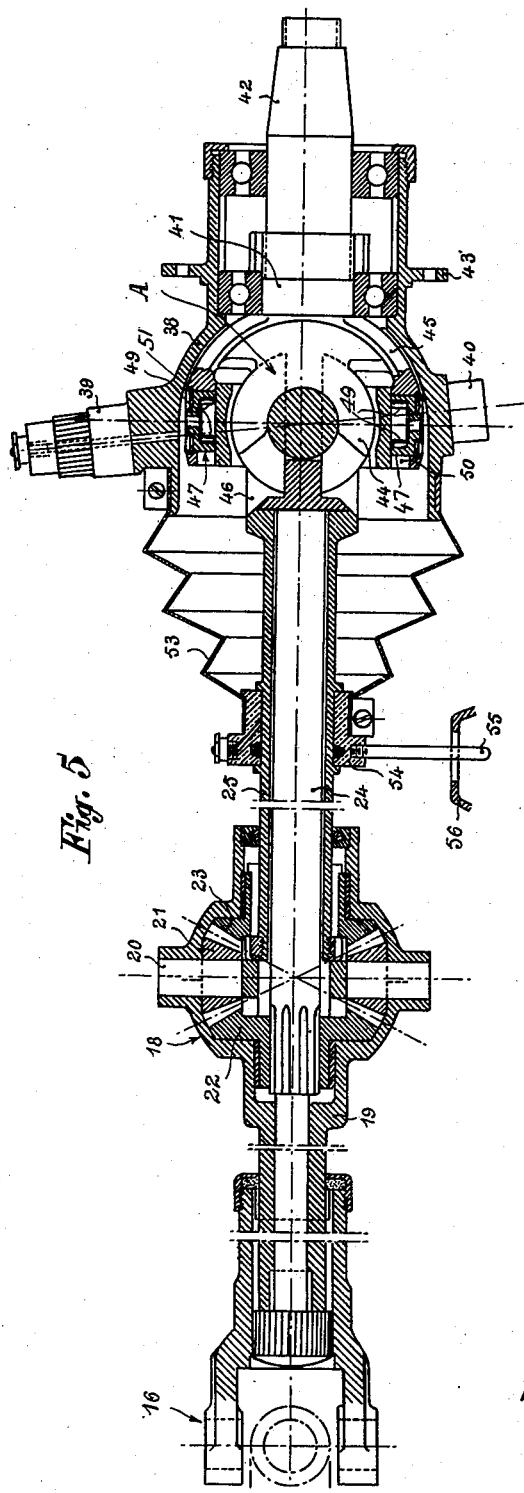
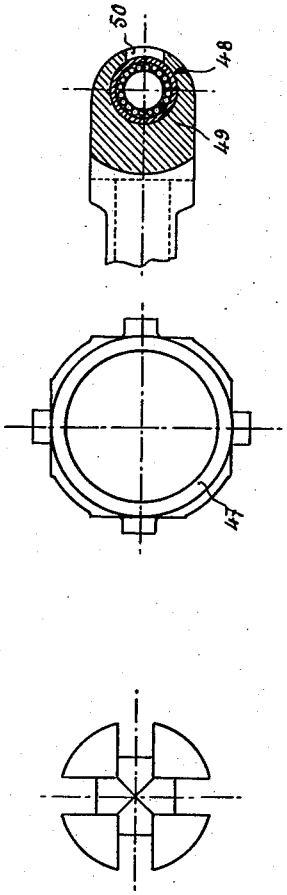
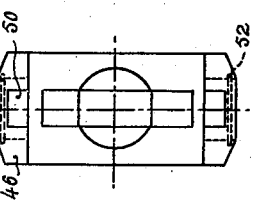
INVENTORS
JOANNY FAURE
ANTOINE PIERRE CHAVRIER
BY *Haseltine, Lake & Co.*
ATTORNEYS Dec. 29, 1936.  J. FAURE ET AL  2,065,999
UNIVERSAL JOINT
Filed May 9, 1935   4 Sheets-Sheet 4

INVENTORS
JOANNY FAURE
ANTOINE PIERRE CHAVRIER
BY Haseltine, Lake & Co.
ATTORNEYS Patented Dec. 29, 1936

2,065,999

UNITED STATES PATENT OFFICE 2,065,999

UNIVERSAL JOINT

Joanny Faure and Antoine Pierre Chavrier, Lyon, France

Application May 9, 1935, Serial No. 20,524
In France May 19, 1934

4 Claims. (Cl. 64—21)

The present invention relates to a transmission for an automotive vehicle or the like having front driving and steering wheels, wherein the wheels are controlled by means of a differentially compensated Cardan joint system of the type described in U. S. specification 1,498,678 of the 24th June 1924.

The main object of the invention is to increase the strength and rigidity of a transmission including the universal joint of the type indicated, as well as to employ such a joint to excellent advantage.

In the construction hereinafter described in two variations of the same type, the shaft of the inner Cardan joint completely traverses the whole in order to maintain its rigidity.

Moreover, the compensation differential is disposed at any point of the control shaft where it does not interfere with the operation of the other members.

The steering pivot, which is either vertical or slightly inclined, encounters the ground at the point of contact of the wheel.

The invention will be well understood with reference to the accompanying drawings, in which Figures 1-4 relate to the first construction and Figures 5-10 to the second construction.

Figure 2 is a longitudinal section through the axis of the vehicle,

Figure 4 is an end view of the said axle,

Figure 6:
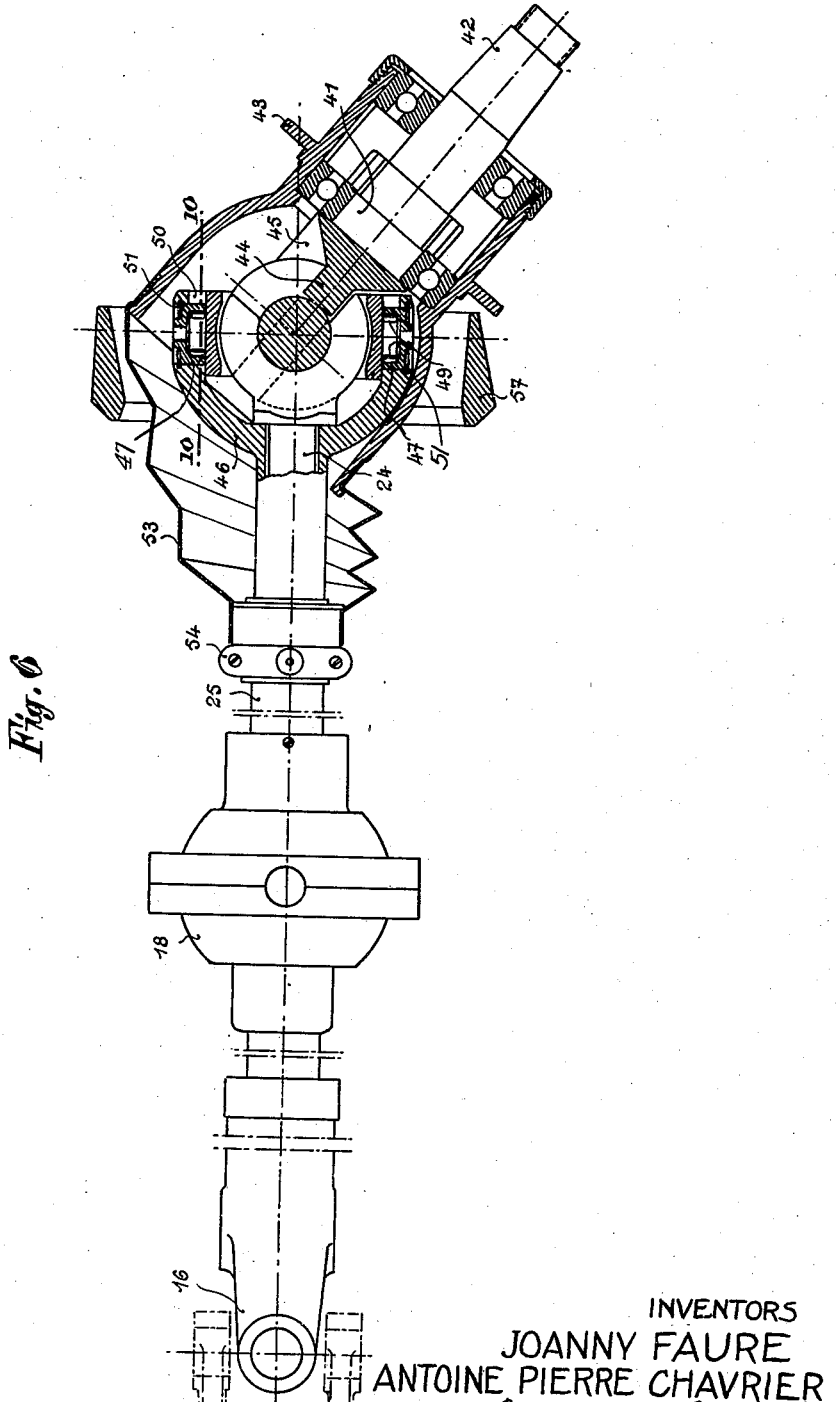

Figure 5 is a vertical section through the axis of the shaft controlling the wheel in the case of the second construction, Figure 6 is a horizontal section thereof also passing through the same shaft, Figure 7 is an end view of the control fork, Figure 8 is a view of the inner sphere, Figure 9 is a view of the outer cross, and Figure 10 is a section of one of the needle bearings of the outer Cardan joint on the line 10—10 of Figure 6.

In these drawings, the rear of the vehicle is not shown, the rear axle being a simple supporting axle of a current type.

Throughout the views, the same reference numerals indicate the same or like parts.

As is shown in Figures 1-4, the shaft 1 extending from the clutch situated in the casing 2 and followed by the casing of the engine 3 is made in one with the pinion 4 driving the intermediate shaft 5.

The said pinion 4 is also provided with direct engagement claws at 6.

The two sliding gear wheels 7 and 8 render it possible to engage any speed by sliding on the fluted shaft 9.

This shaft 9 carries the conical pinion 10 and the movement is transmitted to the differential controlling the wheels 14 by the conical wheel 11 and the cylindrical gears 12 and 13.

On either side of the differential 14 there extends a shaft 15 bearing Cardan joint 16 of any type, either sliding or having a sliding shaft.

According to the invention, Figures 1, 2, 5 and 6, this Cardan joint transmits the rotary movement to the wheels, through the intermediary of a compensation differential 18, the casing 19 of which is engaged through the intermediary of the member 20 (shaft having two branches or cross having three or four branches) and the satellites 21.

The torsional effort is transmitted to the planet wheels 22 and 23, one of which controls, through the centre shaft 24, the forks of the inner Cardan joint of the differential compensation joint A, while the other controls the fork of the outer Cardan joint of the said joint A through the hollow shaft 25.

The shaft 24 passes through the differential 18 and the joint 16.

In other words, the differential serves to regulate the movement resulting from the transmission by the two concentric Cardan joints, and it operates in the following manner: When one of the joints, the exterior joint, for example, imparts an acceleration to the exterior receiving shaft, the interior joint, which is keyed at 90°, imparts precisely at the same instant an equivalent retardation to the interior receiving shaft, but the differential balances these two movements, and takes the mean, so as to annul the advance of one joint by the retardation of the other. In this manner the regularity of the motion of the driving shaft reappears again in the receiving shaft whatever may be the working angle of the two shafts. The oscillating movement of the differential is repeated eight times per revolution, each of the joints being alternately in advance and behind in movement.

In the construction shown in Figures 1-4, the hub of the wheel 26 turning on bearings 27 is supported by a cage 28 adapted to turn about the axis X Y, in order to permit the steering lock of the wheels. This axis is vertical, passes through the centre of the Cardan joint A and encounters the ground at C at the point of contact of the wheel. The said Cardan joint A is, on the other hand, placed in the centre of the wheel 26.

The steering lever 29 and the coupling bar 30 control the lock. The pivoting axis X Y is held by two bearings in the fork of the axle 31. At 32 the suspension springs and at 33 the tubes forming axles are arranged. A spherical cover 34 not taking part in the rotational movement protects the Cardan joint and permits it to operate in an oil bath, and the brake drums may be placed either directly on the wheels or, as is shown in Figure 1, at 35 on the casing of the differential 14, whereby the brake is applied to the differential, or on the plate 36 of the Cardan joint 16, which provides two independent brakes each keyed on one wheel through the intermediary of the shafts.

Figure 1:
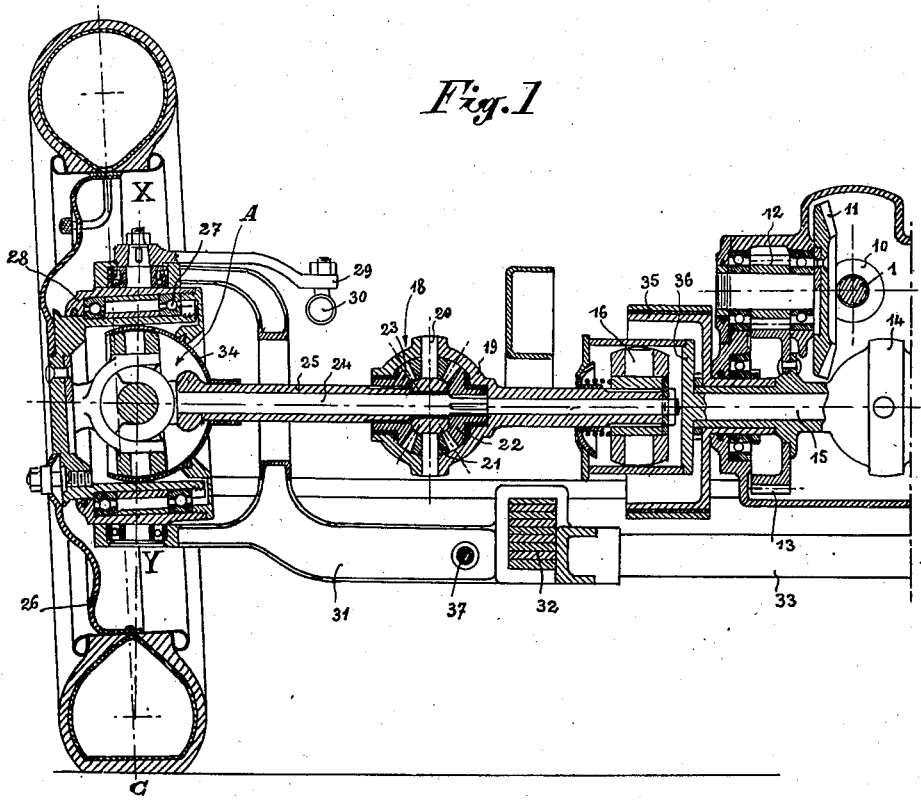
Figure 1 is a cross-section through the axis of the front axle.
Figure 3:
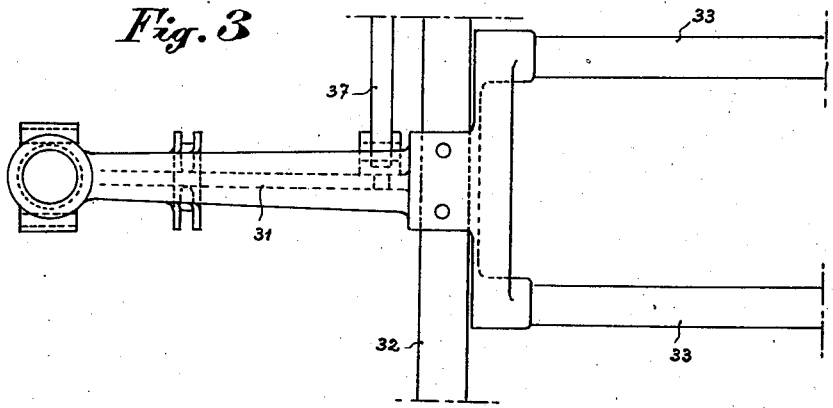
Figure 3 is a plan view of the forked axle provided with the Cardan joint.

In other words, Fig. 1 shows a brake drum rigidly connected with the principal differential 14 of the vehicle, and it acts on the two wheels through the medium of this differential and brakes the two wheels at the same time. Hence, this brake may therefore be single in form.

It acts only on this wheel, and the opposite wheel must be served by a second brake mounted in the same way.

At 37 are situated the draw bars, the reaction of the rotational couple being absorbed by the springs.

As the space in the wheels is limited for the arrangement therein of a Cardan joint of given resistance, the differential Cardan joint occupies, with equal resistance, a space of 35% to 50% less than the double Cardan joints at present used. In fact, in the differential Cardan joint, the two joints are placed in parallel and each takes up only a half of the effort transmitted, while in double Cardan joints, the Cardan joints are in series and each takes up the whole of the effort transmitted. The resistance of each must therefore be double that of one of the Cardan joints of the differential joint, so that the dimensions are much greater.

In the construction according to Figures 5-10, the whole of the Cardan joint is supported by a member 38 bearing the steering pivots 39 and 40.

The shaft 41 carries the wheel and its brake drum (not shown in the drawings) which are locked on the cone 42. The plate supporting the brake jaws is secured to the flange 43. This shaft 41 is integral with the fork 44 of the inner Cardan joint and the fork 45 of the outer Cardan joint. This outer Cardan joint is constituted by the two forks 46 and 45 and the cross 47 having four branches illustrated only in Figure 5. This cross is connected to the forks by cups 48 enclosing rollers or balls 49 intended to reduce to a minimum the friction and wear of the journals of the cross.

For purposes of mounting, a recess 50 is provided for the passage of the cross and the cups 48 are stopped by elastic members 51 held in circular grooves 52 provided in the forks (see Figure 7). A leather sheath 53 held in a fixed collar in two parts 54 permits of protecting the joint from mud and dust and of holding it in an oil or grease bath.

An arm 55 itself stopped by a groove provided in a member 56 secured to one of the suspension arms prevents the leather from being carried along by the rotation of the shaft 25.

The member 57 (Figure 6) represents in section the frame supporting the steering pivots.

What we claim and desire to secure by Letters Patent of the United States is:—

1. A transmission for automotive vehicles having front driving and steering wheels, comprising the combination of a differentially compensated Cardan joint system, including a freely rotatable shaft, a fork connected to said shaft, a tubular shaft surrounding said first shaft and provided with a second fork which is of lesser diameter than said first fork and coaxially disposed and rotatable within said first fork, a third fork having two pairs disposed at right angles to each other and of which one pair is of greater width than the other pair, a coupling member within said forks to which the arms of said forks are connected to allow universal movement thereof, a differential gear having pinions connected to the shafts of said first and second forks, and also a shaft and planetary pinions connected by arms to the shaft, and a conventional Cardan joint disposed on the side of said differentially compensated Cardan joint system which is remote from the vehicle wheel to be driven, said conventional Cardan joint being conventionally disposed adjacent to the main differential gear of the gear of the transmission directly connected to the gear box of the vehicle, and an integral extension of said first shaft of said first fork within said tubular shaft extending entirely through and past said first differential gear to said conventional Cardan joint.

2. A transmission according to claim 1, wherein the steering pivot of each front driving wheel and the pivots of each Cardan joint of the differentially compensated Cardan joint system driving said wheel are disposed substantially in the plane of said wheel, at least the central portion of the latter being dished in order to receive the portions of said system closely associated with, or terminating adjacent to said wheel.

3. A transmission according to claim 1, wherein the forks of the outermost Cardan joint of the differentially compensated Cardan joint system are formed with recesses and with circular openings, and wherein said joint has pivots which may be passed through said recesses and cups for enclosing and retaining said pivots in position in the forks, which cups may be passed through said circular openings.

4. A transmission according to claim 1, wherein the forks of the outermost Cardan joint of the differentially compensated Cardan joint system are formed with recesses and with circular openings having grooves in the walls thereof, and wherein said joint has pivots which may be passed through said recesses and cups for enclosing and retaining said pivots in position in the forks, which cups may be passed through said circular openings, and resilient split retaining rings disposed in said grooves and projecting inwardly over the ends of said cups in order to retain the latter in the forks when the cups are in place.

JOANNY FAURE.
ANTOINE PIERRE CHAVRIER.